United States Patent
Scheck et al.

(10) Patent No.: US 7,798,572 B2
(45) Date of Patent: Sep. 21, 2010

(54) MANUAL ADJUSTMENT OF A BACK SUPPORT ON A VEHICLE SEAT

(75) Inventors: Georg Scheck, Weitramsdorf (DE); Alwin Macht, Ebensfeld (DE); Andreas Prause, Coburg (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 278 days.

(21) Appl. No.: 11/921,359

(22) PCT Filed: May 30, 2006

(86) PCT No.: PCT/DE2006/000925

§ 371 (c)(1),
(2), (4) Date: Dec. 18, 2007

(87) PCT Pub. No.: WO2006/128431

PCT Pub. Date: Dec. 7, 2006

(65) Prior Publication Data

US 2009/0200847 A1    Aug. 13, 2009

(30) Foreign Application Priority Data

May 30, 2005 (DE) .................... 10 2005 025 122
May 30, 2005 (DE) .................... 20 2005 008 565 U

(51) Int. Cl.
A47C 7/14 (2006.01)
(52) U.S. Cl. .................... 297/284.4; 297/284.8
(58) Field of Classification Search .............. 297/284.1, 297/284.4, 284.8
See application file for complete search history.

(56) References Cited

U.S. PATENT DOCUMENTS

| 5,641,205 A | * | 6/1997 | Schmidt | ................ 297/284.7 |
| 6,056,360 A | | 5/2000 | Schneider | |
| 6,338,530 B1 | * | 1/2002 | Gowing | ................ 297/284.4 |

(Continued)

FOREIGN PATENT DOCUMENTS

DE    201 00 018 U1    2/2002

(Continued)

OTHER PUBLICATIONS

English translation of International Preliminary Examination Report for corresponding PCT application No. PCT/DE2006/000925, dated Dec. 6, 2007.

(Continued)

*Primary Examiner*—Sarah B McPartlin
(74) *Attorney, Agent, or Firm*—Christie, Parker & Hale LLP

(57) ABSTRACT

A manual adjustment of a back support on a vehicle seat includes a cable pulley which is selectively rotatable in a drive direction or in a driven direction oriented counter to the drive direction, and a tensile device associated with the cable pulley, which may be rolled up onto the cable pulley by rotating the cable pulley in the drive direction. The tensile device is able to be coupled to a back support of a vehicle seat such that the rotation of the cable pulley in the drive direction and/or driven direction affects an adjustment of the back support. A pretensioning acts on the cable pulley -which produces a torque of the cable pulley in the driven direction.

43 Claims, 11 Drawing Sheets

U.S. PATENT DOCUMENTS

| | | | |
|---|---|---|---|
| 6,688,443 B2 * | 2/2004 | Liu .............................. | 192/15 |
| 6,905,170 B2 * | 6/2005 | McMillen et al. ........ | 297/284.4 |
| 6,945,600 B2 * | 9/2005 | Liu .......................... | 297/284.4 |
| 7,597,647 B2 * | 10/2009 | Calinescu ................... | 475/331 |

FOREIGN PATENT DOCUMENTS

| | | |
|---|---|---|
| DE | 201 00 018 US | 2/2002 |
| DE | 203 13 925 U1 | 10/2004 |
| WO | WO 96/33640 | 10/1996 |

OTHER PUBLICATIONS

International Search Report, dated Oct. 25, 2006, corresponding to PCT/DE2006/000925.

* cited by examiner

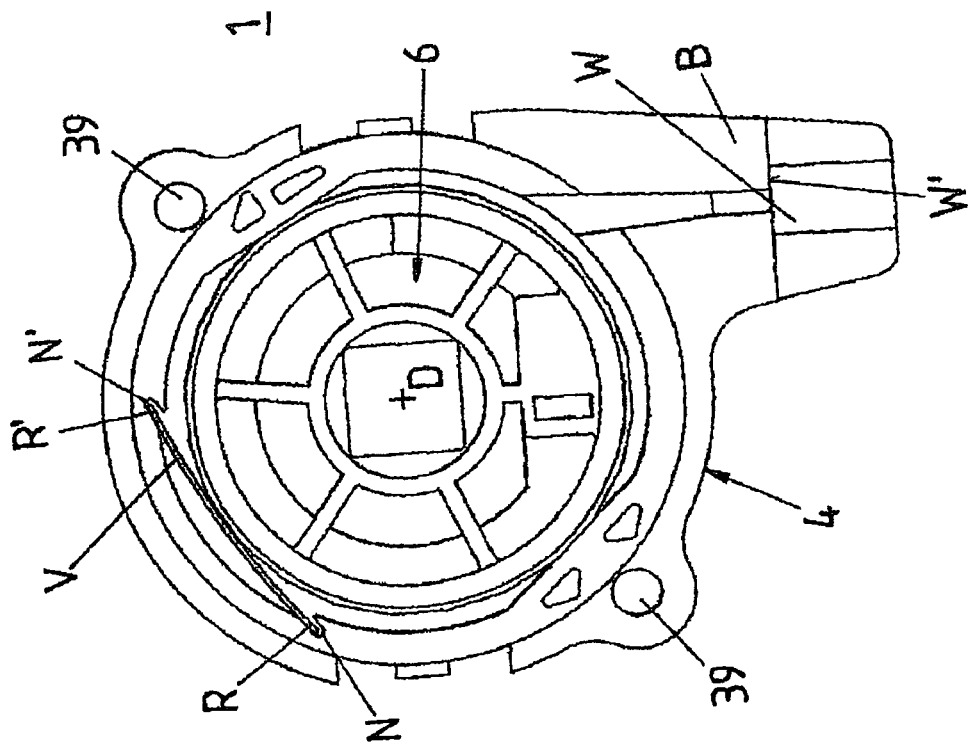
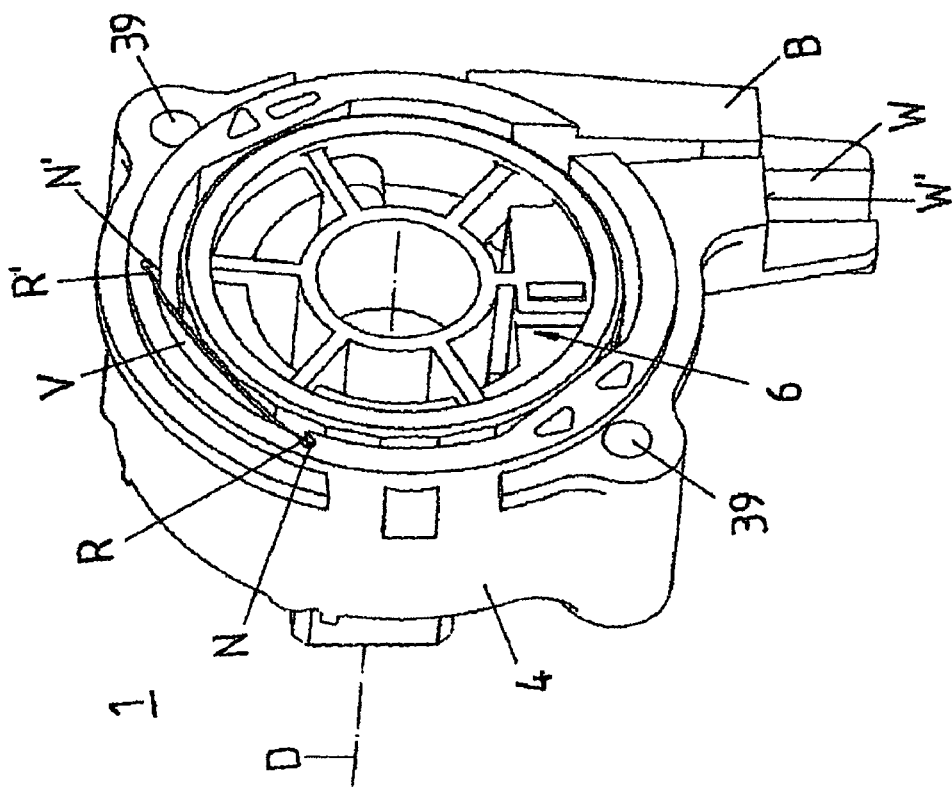

MANUAL ADJUSTMENT OF A BACK SUPPORT ON A VEHICLE SEAT

CROSS-REFERENCE TO A RELATED APPLICATION

This application is a National Phase Patent Application of International Patent Application Number PCT/DE2006/000925, filed on May 30, 2006, which claims priority of German Utility Model Application Number 20 2005 008 565.0, filed on May 30, 2005 and German Patent Application Number 10 2005 025 122.6, filed on May 30, 2005.

BACKGROUND

The invention relates to a back support on a vehicle seat.

A manual adjustment for a back support comprises a cable pulley, which is mounted on a rotational axis, and which may be rotated in a drive direction and in a driven direction oriented counter to the drive direction. A tensile means is associated with the cable pulley, which is partially rolled up onto the cable pulley. As a result of the rotation of the cable pulley in the drive and/or driven direction, the length of the portion of the tensile means which is rolled up onto the cable pulley, as well as the length of the portion of the tensile means which is unrolled from the cable pulley, may be adjusted.

The tensile means is configured and provided to be coupled to a back support of a vehicle seat. In an installed position, a rotation of the cable pulley in the drive direction and/or driven direction causes an alteration to the length of the portion of the tensile means unrolled from the pulley and, as a result, an adjustment of the back support.

Such a back support is, for example, known from the German utility model DE 203 13 925. The back support of a motor vehicle seat known from the utility model may be displaced and/or adjusted by moving a slide, which is moved along a guide rail. The slide may, for example, be moved by the tensile means of such a manual adjustment.

Known manual adjustments for back supports, therefore, comprise either two cable pulleys which may move the back support in a drive direction and a driven direction or manual adjustments of relatively complicated construction comprising integral right-hand and left-hand threads.

SUMMARY

It is the object of the present invention to provide a manual adjustment of a back support which may be adjusted by handling in a simple manner and, therefore, is of as compact construction as possible.

According to the invention a pretensioning acts on the cable pulley, which produces a torque of the cable pulley in the driven direction. The length of the portion of the tensile means which is rolled up onto the cable pulley may be shortened by the cable pulley yielding to the torque in the driven direction and rotating in the driven direction. In the drive direction, the length of the rolled-up portion of the tensile means may be adjusted by rolling the tensile means onto the cable pulley.

As a result, the use of a right-hand and a left-hand thread for the manual adjustment and/or the use of two cable pulleys becomes superfluous, which makes the manual adjustment according to the invention particularly cost-effective.

In one exemplary embodiment the cable pulley is pretensioned by force transmission via the tensile means. The tensile means is thus pretensioned such that it produces a torque of the cable pulley in the driven direction. By the pretensioning of the tensile means, when the cable pulley is rotated in the driven direction, the tensile means is automatically unwound from the cable pulley, whilst when rotated in the drive direction it is rolled up again. By an adjustment of the length of the portion of the tensile means which is rolled up and/or rolled off, the adjustment of the motor vehicle part which may be coupled to the tensile means (for example a back support) is controlled and, as a result, a user of the manual adjustment, when rotating the cable pulley, has control over the adjustment of the motor vehicle part.

In this case, the tensile means is preferably coupled to an element (for example a slide) of a lumbar adjustment device for adjusting the back support, a pretensioning acting on the element which is transmitted by the tensile means to the cable pulley. Thus, a resilient tensioning element which generates the pretensioning does not have to be a component of the manual adjustment. It may instead act directly on the element of the lumbar adjustment, as the pretensioning is transmitted via the tensile means from the element to the cable pulley. The direction in which the element is pretensioned is the direction in which the tensile means is coupled to the element, preferably an opposing direction, in order to ensure transmission of tension which is as free from losses as possible.

In one exemplary embodiment, a rotation of the cable pulley in the drive direction always takes place counter to the torque produced by the pretensioning in the driven direction. The rotational direction of the cable pulley is thus oriented according to whether the torque acting on the cable pulley as a result of the pretensioning or a torque resulting from rotating the cable pulley in the drive direction is greater.

In one exemplary embodiment, the manual adjustment has a lock which in a locked position restricts the rotation of the cable pulley in the driven direction. The restrictive effect of the lock is in this case sufficiently large to prevent the cable pulley from a rotational movement against the torque produced by the pretensioning. The cable pulley is prevented by the lock from rotating into an undesirable position due to the pretensioning. In the locked position, the position and/or location of the back support adjusted for manual adjustment remains maintained.

The cable pulley is rotated in the drive direction counter to the friction of the adjusting movement to be applied for the adjustment of the back support and is therefore restricted at least by a corresponding frictional force. In the locked position, the lock also restricts a rotation of the cable pulley in the driven direction. Thus any rotation of the cable pulley is braked about its rotational axis by the lock.

In this case, the pretensioning preferably causes the manual adjustment to move into the locked position. As a result of the pretensioning, a force acts on the cable pulley as part of the manual adjustment. Said force is utilized to transfer the manual adjustment from a freely adjustable position into the locked position.

In one exemplary embodiment, it is provided that the manual adjustment automatically adopts the locked position when the manual adjustment is stationary in a non-actuated position. In this case, the non-actuated position denotes a state of the manual adjustment which said manual adjustment adopts when it is not actuated for adjusting the back support.

In an exemplary development of said embodiment, the cable pulley is in frictional contact with a braking surface of the lock in the locked position. As a result of the frictional contact, the rotation of the cable pulley is restricted in the driven direction. The level of the restriction is thus determined by the variables determining a frictional force between the cable pulley and the braking surface, such as for example the frictional coefficient. In particular, in the locked position the cable pulley may be pressed by the pretensioning against the braking surface. If the cable pulley is pretensioned, for example by applying a tensile force on the tensile means, a force therefore acts in a direction on the cable pulley in which the tensile means is guided away from the cable pulley. In the locked position, said force is utilized in order to press the cable pulley against the braking surface. Particularly preferably, the lock comprises two braking surfaces extending toward one another in a wedge-shaped manner, between which the cable pulley is arranged. In the locked position, the cable pulley is in frictional contact with both braking surfaces. To this end, the cable pulley is moved relative to the braking surfaces in the direction of the wedge tip. The cable pulley is thus wedged in the locked position between both braking surfaces.

The braking effect may be influenced not only via a braking surface but also via an external surface of the cable pulley, designed and provided for bearing against the braking surface and which in the locked position is in frictional contact with the braking surface. For example, an external surface (or a braking surface) made of a resilient material, such as for example rubber, increases the frictional coefficient between the cable pulley (external surface) and the braking surface, whilst a rigid and smooth material, such as for example metal or smooth plastics, reduces the frictional coefficient.

In an exemplary embodiment, it is provided that the external surface has a round or polygonal-type contour in cross section. The edges of the polygonal structure extend, therefore, along the rotational axis, i.e. transversely to the drive and/or driven direction of the cable pulley. According to the number of edges of the polygon it is determined which angle of rotation the cable pulley may adopt in the locked position relative to the braking surface. In the locked position, therefore, a planar region of the external surface defined by two edges of the polygonal structure bears against the braking surface. With a polygonal-type contour of the external surface, accordingly an adjustment of the cable pulley may only take place in diskrete increments (angles of rotation), as a planar region of the external face which is polygonal in cross section always comes to bear against a braking surface. In contrast, with a round (circular) contour of the external surface a continuous adjustment of the cable pulley is possible.

The braking surface and/or the braking surfaces arranged in a wedge-shaped manner are preferably configured on an inner face of the housing facing the cable pulley, which surrounds the cable pulley in cross section (along a cross-sectional plane perpendicular to the rotational axis).

The braking effect between the cable pulley (external surface) and the braking surfaces is achieved both by a frictional connection and by a positive connection. In order to prevent the lock from slipping, i.e. the cable pulley slipping relative to the braking surface where there is low cable force and suddenly occurring tensile force acting on the tensile means, in a variant of the invention a pretensioning element resiliently pretensioned against the cable pulley is additionally provided which is configured to press the cable pulley against the two braking surfaces (V contour) extending toward one another, in order to prevent the cable pulley from moving out of the locked position. The pretensioning element thus generates a basic pretensioning of the cable pulley/braking surface system.

In one exemplary embodiment, the pretensioning element opposes the two braking surfaces arranged in a wedge-shaped manner, transversely to the rotational axis. Preferably, the pretensioning element is secured to an inner face of the housing of the manual adjustment opposing the cable pulley, transversely to the rotational axis and/or surrounding the cable pulley in cross section.

Preferably, the pretensioning element is configured as a planar leaf spring, which may be bent against the cable pulley. In a variant of the invention, for securing the leaf spring on the inner face of the housing to a first edge region extending along the rotational axis, the leaf spring is inserted into a first groove configured along the rotational axis on the housing, and to a second edge region opposing the first edge region transversely to the rotational axis, the leaf spring is inserted into a second groove provided along the rotational axis on the housing. The two grooves thus encompass the two edge regions of the leaf spring respectively in cross section. As a result, the leaf spring may be secured in a simple manner (without further fastening means) to the housing.

In an exemplary embodiment, the lock may be released by actuating the manual adjustment. If the cable pulley is moved in the drive direction or driven direction, the lock is automatically released. The manual adjustment is thereby moved from the locked position and is able to rotate. This may, for example, be effected by a braking surface of the lock being formed on the inner face of a housing, which encloses and/or limits the manual adjustment. A rotational force of an actuator, acting by actuation on the cable pulley would thus overcome the locking action.

For actuating the cable pulley, preferably a hand wheel is provided which is coupled to the cable pulley such that a rotation of the hand wheel causes a rotation of the cable pulley. The hand wheel and cable pulley are thus preferably rotatable about the same axis and arranged adjacent to one another and coupled to one another in a rigid connection.

If in this case the hand wheel is not actuated, in particular not rotated, the manual adjustment is stationary in a non-actuated position. In the non-actuated position the locking action of the lock is initiated.

A Bowden cable is provided as preferred tensile means, the core thereof being fastened to the cable pulley and being able to be wound onto and wound off the cable pulley. In this case, the sheath of the Bowden cable is supported against a housing of the manual adjustment. An exertion of the force of the sheath relative to the core, therefore, may—depending on the relative direction—cause a rotation of the cable pulley relative to the housing.

In an exemplary embodiment of the invention, a stop of the cable pulley, connected fixedly in terms of rotation to the cable pulley, is provided which, when rotating the cable pulley from a first end position into a second end position for limiting the adjustment path, cooperates with a counter stop of the manual adjustment which is stationary relative to the rotational axis and which is preferably configured on the housing of the manual adjustment.

Particularly preferably, the stop cooperates with the counter stop via an additional coupling member which may be rotated about the rotational axis. To this end, the coupling member preferably has a first stop region cooperating with the stop and a second stop region cooperating with the counter stop, so that when rotating the cable pulley into the second end position the stop of the cable pulley comes into engagement with the first stop region and drives the coupling member into the second end position for lengthening the adjustment path.

As a result, the adjustment path of the cable pulley between the first and the second end position is lengthened in a simple manner as, relative to a conventional cable pulley, the stop thereof cooperating directly with a counter stop so that an adjustment path of approximately 360° is able to be achieved, the cable pulley may be rotated firstly relative to the coupling member about an angle of rotation of a maximum of approximately 360° and subsequently, driving the coupling member, may be rotated together with the coupling member about a further angle of rotation of a maximum of approximately 360° into the second end position, in which the coupling member for limiting this rotational movement strikes against the counter stop with its second stop region. Thus, in total, a lengthened adjustment path of approximately 720° may be achieved.

Preferably, the coupling member at least partially surrounds the rotational axis, and namely in particular in an annular manner, i.e. in an enclosed manner. In this connection, the coupling member encompasses a portion of the cable pulley in cross section, i.e. transversely to the rotational axis.

In one exemplary embodiment, the first and the second stop regions of faces remote from one another project from the coupling member in opposing directions along the rotational axis. As a result, the cable pulley may be rotated by approximately 360° relative to the coupling member—as may the coupling member relative to the rotational axis (or a housing of the cable pulley)—so that in total (due to the rotatable bearing arrangement of the coupling member) an adjustment path of approximately 720° is possible.

Preferably, the first stop region opposes the second stop region transversely to the rotational axis. In other words, with an annular coupling member (rotationally symmetrical relative to the rotational axis), with a rotation of the coupling member by 180° about the rotational axis, the position of the first stop region in an extension plane of the coupling member oriented perpendicular to the rotational axis, is transferred into the position of the second stop region and vice versa.

In an exemplary embodiment of the invention it is provided that the stop projects from the cable pulley along the rotational axis so that, when rotating the cable pulley into the second end position, the stop is able to press against the first stop region of the coupling member in order to drive the coupling member in a rotational direction of the cable pulley so that the coupling member rotates together with the cable pulley.

In an exemplary variant of the invention, the coupling member is rotatably mounted in the housing about the rotational axis, and namely in particular via a plain bearing. Preferably, the housing has in this case a guide for guiding the first stop region along the adjustment path, along which the first stop region may slide. Preferably the counter stop projects from the guide along the rotational axis, so that the second stop region when rotating the coupling member into the second end position may strike against the counter stop, in order to limit the rotation of the coupling member.

BRIEF DESCRIPTION OF THE DRAWINGS

The invention is described hereinafter with reference to embodiments shown in the figures, in which:

FIG. 12 shows a perspective view of the manual adjustment shown in FIG. 11.

FIG. 13 shows a plan view of the manual adjustment shown in FIGS. 11 and 12.

DETAILED DESCRIPTION

Figure 1:
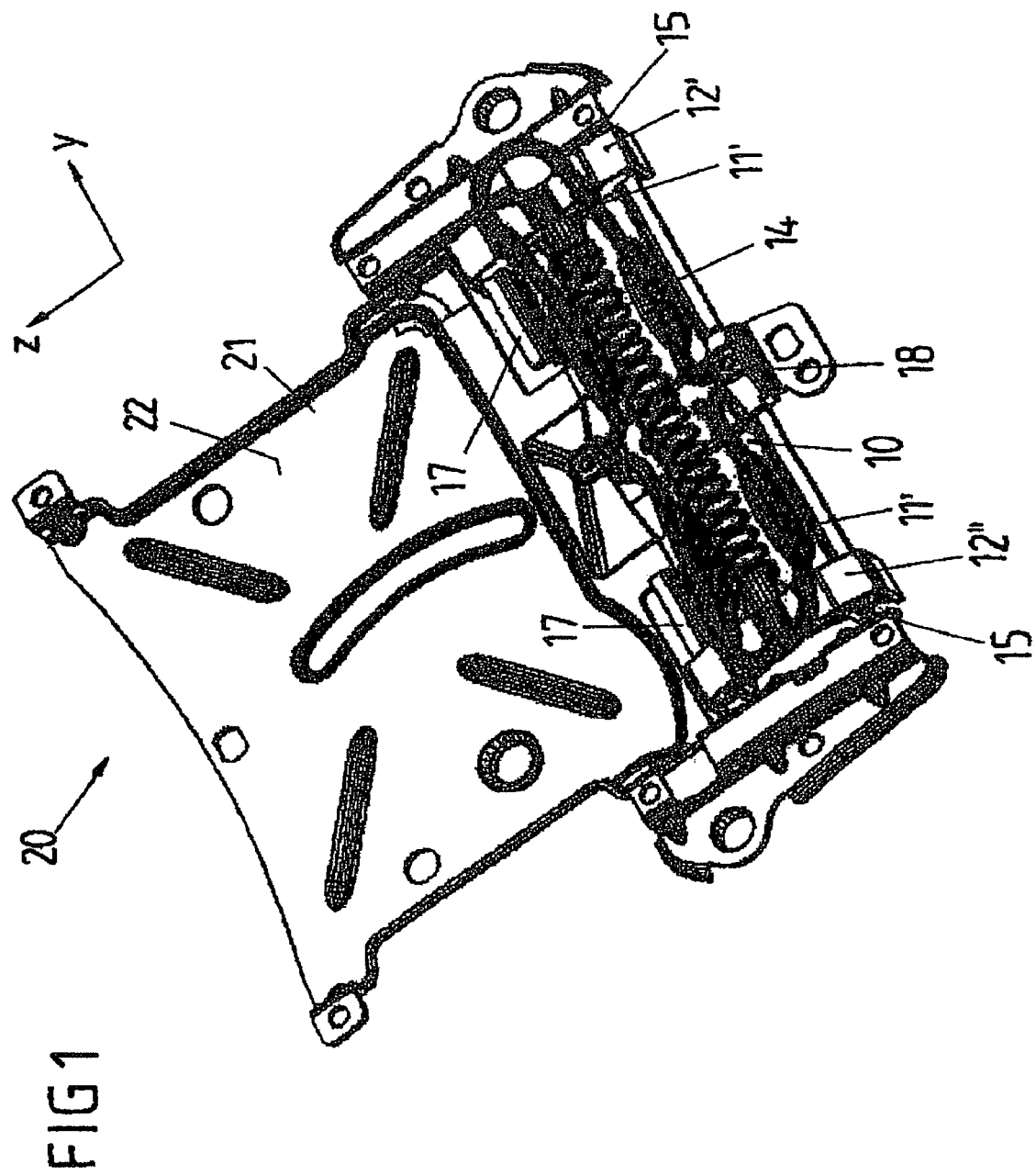
FIG. 1 shows a perspective view of a support with a lumbar adjustment device for adjusting the position of a back support for a backrest of a motor vehicle seat.

Similar or identical features are identified in the figures by the same reference numerals.

An embodiment of a back support for a backrest of a motor vehicle seat is to be explained below with reference to FIGS. 1 and 2. The back support is adjusted by actuating a hand wheel, which subsequently is to be explained with reference to FIGS. 4, 5A, 5B and 6. FIG. 3 shows the cooperation of the manual adjustment from one of FIGS. 4 to 6 with the back support of FIG. 1 and/or FIG. 2.

Figure 7:
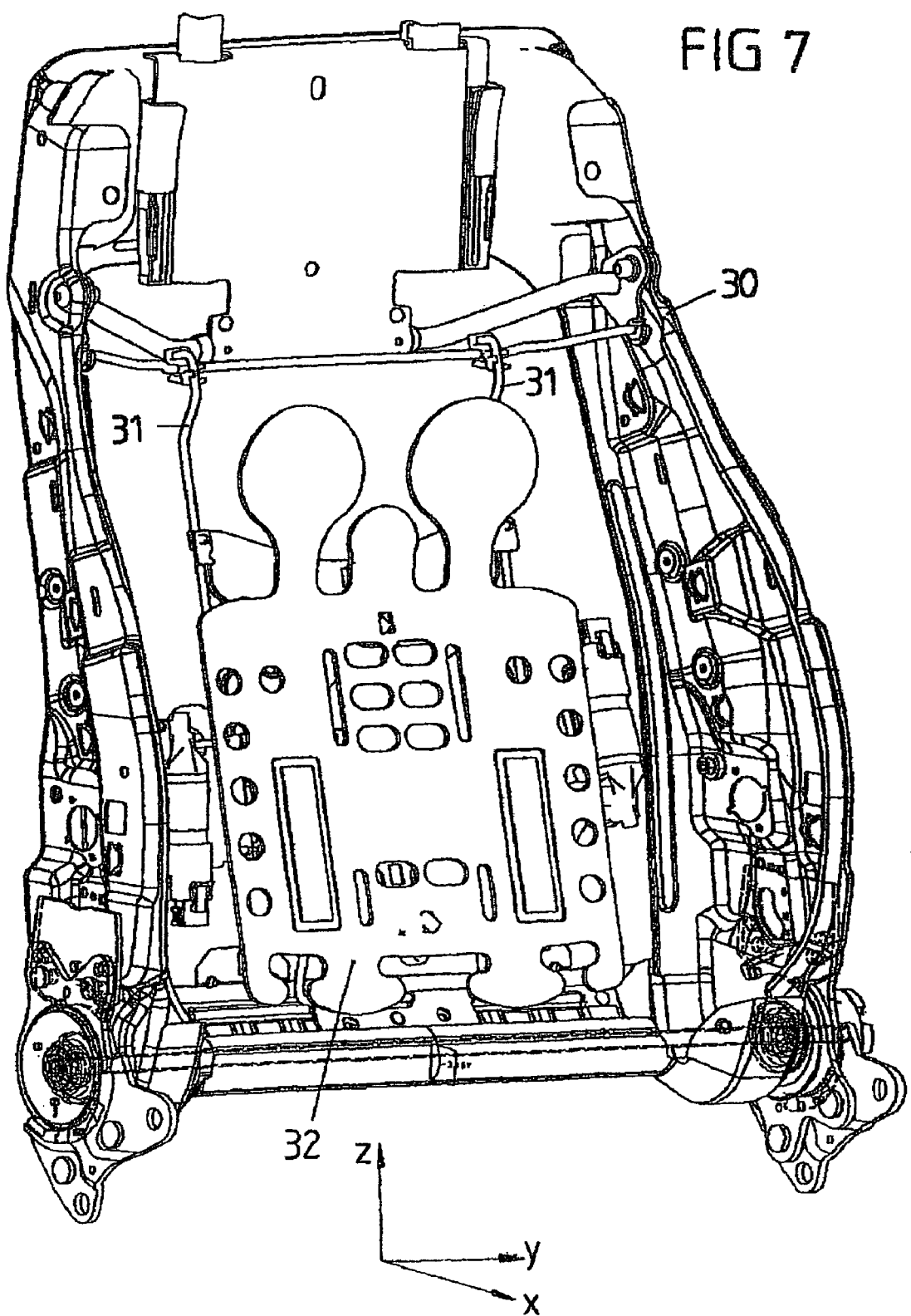
FIG. 7 shows a view of a backrest frame with an adjustable back support in an exploded view.

FIG. 7 comprises a supporting structure of a backrest in the form of a backrest frame 30 and two struts 31 spaced apart from one another and extending respectively in the backrest longitudinal direction z, in front of which a back support 32 is arranged. Said back support is, for example, mounted on the backrest frame 30 by means of spring elements, not shown in the figures.

By the term "backrest longitudinal direction z" is understood in the present case the direction in which the spinal column of a person seated on the corresponding vehicle seat extends, when the backrest on a motor vehicle seat is used according to the intended purpose. With the upright adjustment of the backrest, i.e. when said backrest projects substantially perpendicular from the seat cushion, the backrest longitudinal direction z extends substantially along the vertical vehicle axis z. The backrest frame 30, as well as the back support 32, are therefore located respectively substantially in one plane, which is spanned by the backrest longitudinal axis z as well as the horizontal transverse axis y extending perpendicular thereto.

Figure 2:
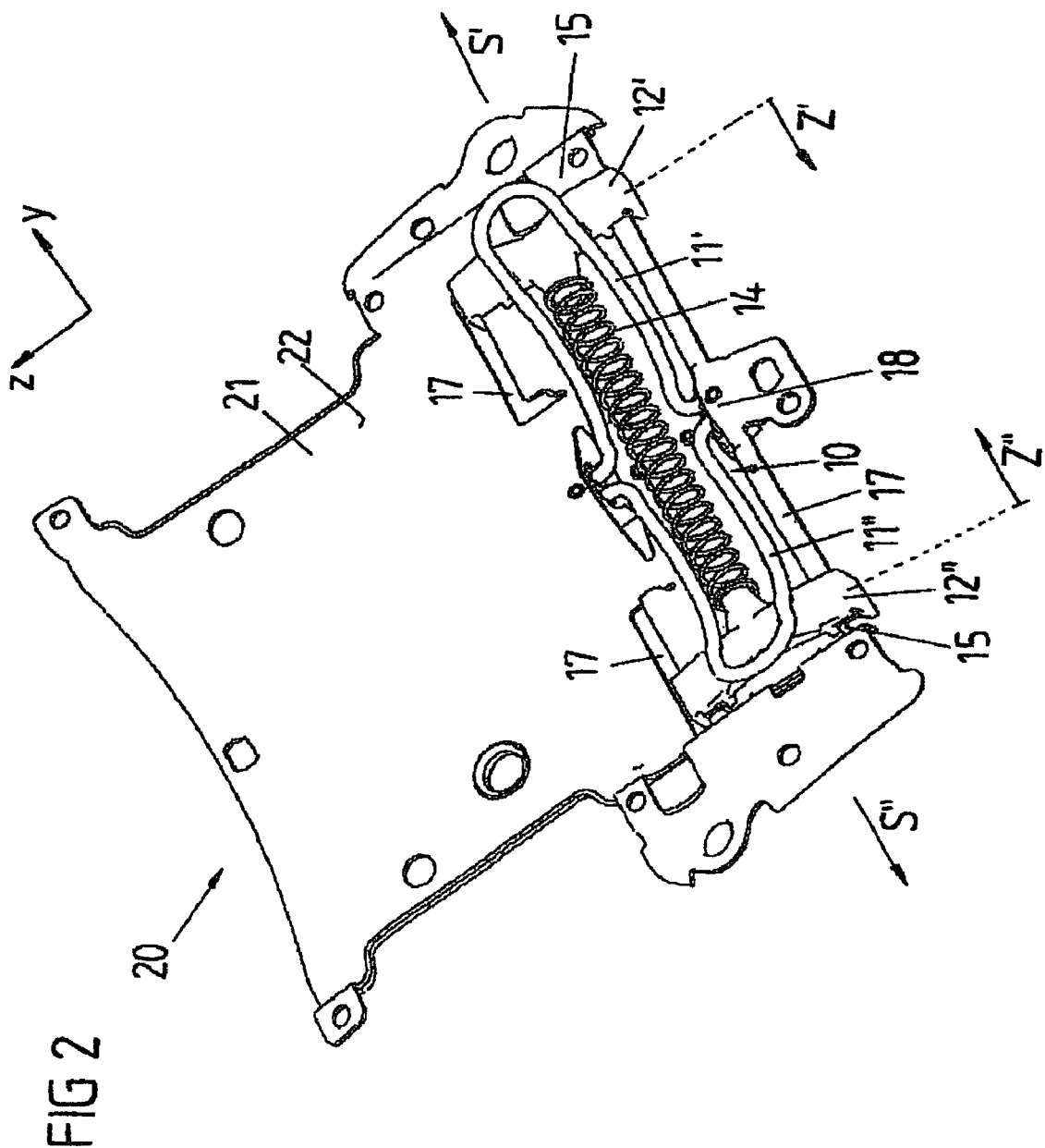
FIG. 2 shows the support of FIG. 1 in a schematic view.
Figure 3:
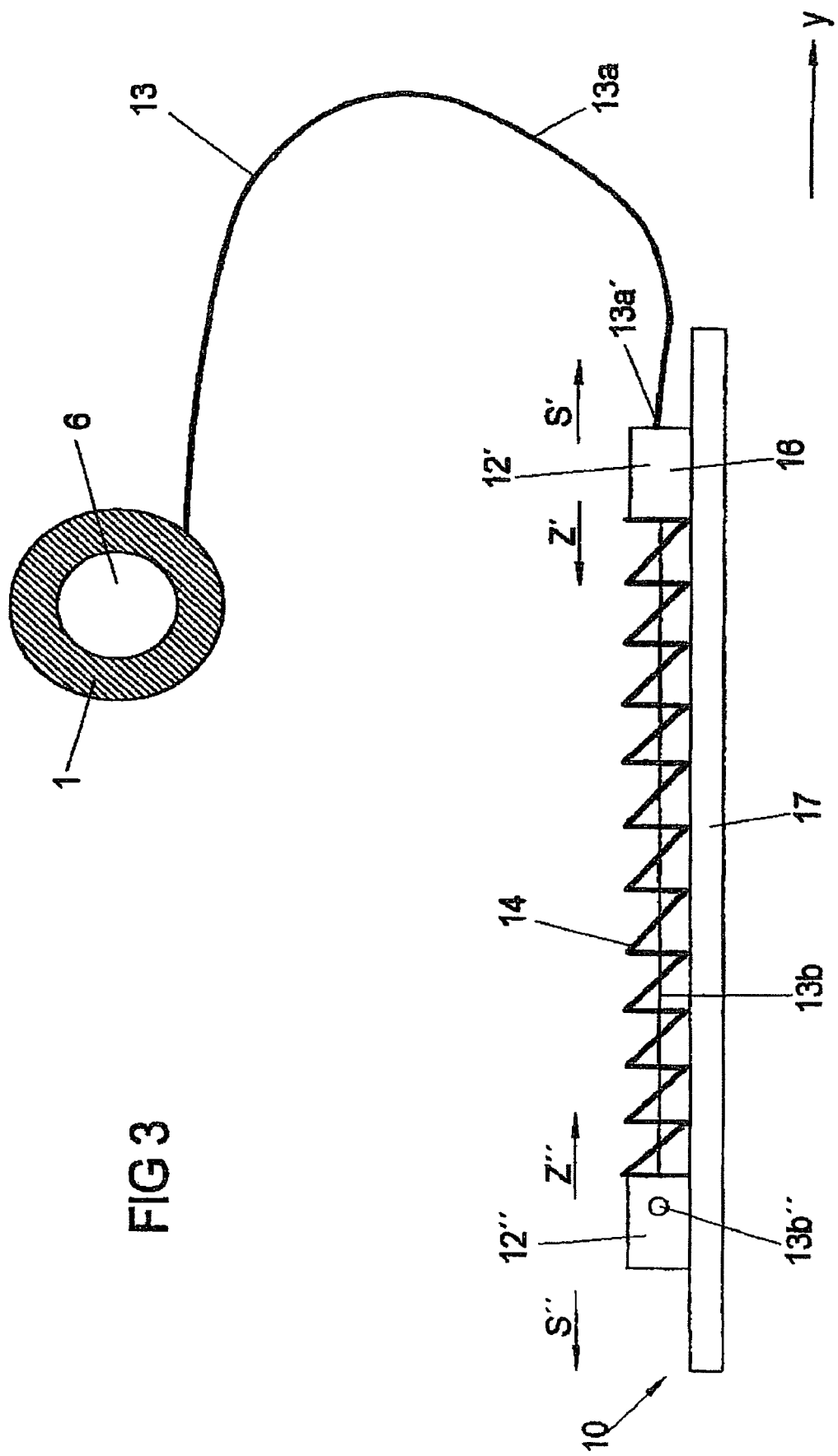
FIG. 3 shows a schematic view of the coupling of the lumbar adjustment device of the support of FIG. 1 with a manual adjustment.

In FIGS. 1 and 2 a support 20 is shown which has a support plate 21 and a lumbar adjustment device 10 arranged thereon. The support plate 21 is fastened to the struts 31 extending in the backrest longitudinal direction z by means of suitable fixing means. The support plate 21 extends in this case along an extension plane of the backrest frame and in the horizontal transverse direction y (perpendicular to the backrest longitudinal direction z), from one strut 31 to the other strut 31. The lumbar adjustment device 10 has a rotary bearing 18 which is approximately central relative to the transverse extension in the transverse direction y and in which two support yokes 11', 11" are pivotably articulated.

Each of the two support yokes 11', 11" respectively extends from its two ends articulated pivotably on the rotary bearing 18 to one of the two lateral edges of the support plate 21. The U-shaped support yokes 11', 11" have a curvature so that they respectively define a ramp with variable curvature, which cooperates with one respective corresponding slide 12', 12".

The two slides 12', 12" are guided on one respective slide guide 17, arranged and/or configured on the support plate 21 in the direction of extension of the arms of the U-shaped support yoke 11', 11". They engage under the two support yokes 11', 11", therefore, on the curved portions thereof, and cooperate therewith in a ramp-like manner according to the wedge principle. The two slides 12', 12" are movable along the respectively associated slide guide 17 in a manner opposing one another in the horizontal transverse direction y by means of a manually operated mechanism, not shown. By displacing the slides 12', 12" in the direction y parallel to the extension plane of the backrest frame 30, by means of the support yokes 11', 11" an adjustment of the position and/or curvature of the back support 32 may be undertaken in a direction x perpendicular to the extension plane (yz plane) of the backrest frame 30. This is based on the fact that the slides 12', 12" cooperate with correspondingly curved portions of the support yokes 11', 11" according to the wedge principle, so that a movement of the slides 12', 12" in the direction y is converted into a movement of the support yokes 11 (namely in a pivoting movement about the rotary bearing 18 of the support yokes 11), which has a component in the x direction perpendicular to the extension plane of the backrest frame 30.

By the symmetrical arrangement of the two support yokes 11', 11" and the associated slides 12', 12" relative to an axis of symmetry extending in the backrest longitudinal direction z, in this case a symmetrical, uniform bending and/or adjustment of the back support 32 is ensured. The support yokes 11', 11" serve, therefore, as adjusting elements for adjusting the position of the back support.

The two slides 12', 12" are pretensioned by a tensioning element 14. The tensioning element 14 in the embodiment is configured as a spiral spring which extends in the backrest transverse direction y and pretensions the two slides 12', 12" in this direction toward the struts 31 (tensioning directions S' and S").

The tensioning element 14 effects a pretensioning of the two slides 12', 12" in opposing directions, the tensioning directions S' and S".

The pretensioning produces a thrust force acting on the slides 12' and 12".

Provided on the side edge of the support plate 21 are slide stops 15 which define the slide guide 17 outwardly and prevent the slides 12' and 12" from being moved beyond the slide stop 15.

The slides 12' and 12", the slide guide 17, the slide stops 15, the tensioning element 14 and the rotary bearing 18 together form the lumbar adjustment device 10 which is arranged on the front face 22 of the support plate 21 and which in an installed position faces the back of a user.

A movement of the slide 12' counter to its pretensioning direction S' is only possible against the pretensioning which is exerted by the tensioning element 14 on the slide 12' (the same applies to the slide 12").

In FIG. 3 it is shown schematically how the slides 12' and 12" of the lumbar adjustment device 10 of FIG. 2 are adjusted and moved. A core 13b of a Bowden cable 13 runs through the longitudinal axis of the tensioning element 14, parallel to the transverse direction of the backrest y and parallel to the plane of the backrest frame.

The Bowden cable 13 serves as a tensile means for transmitting a tensile force which is transmitted by a manual adjustment 1 via the Bowden cable 13 to the slides 12' and 12". The Bowden cable 13 has in this case a sheath 13a which is supported on the slide 12' and terminates there. The core 13b of the Bowden cable 13 is configured to be longer than the sheath 13a and extends in the inside of the sheath 13a. On the end 13a' of the sheath 13a on the slide side, the core 13b projects beyond the sheath 13a and is arranged such that it penetrates the slide 12' and extends along the tensioning element 14 as far as the second slide 12'. The core 13b is fastened with its end 13b" on the slide side to the second slide 12".

The end 13b" of the core 13b on the slide side may be moved by rotation of the manual adjustment 1 relative to the end 13a' of the sheath 13a on the slide side. The position of the manual adjustment 1 determines the length of the core 13b which projects over the end 13a' of the sheath 13a on the slide side and thus the spacing between the two slides 12' and 12".

By shortening the spacing of the ends 13a' and 13b" on the slide side relative to one another, which is carried out by rotating a cable pulley 6 of the manual adjustment 1 in the drive direction, a tensile force is exerted on the slide 12" in a tensile direction Z" which extends counter to the tensioning direction S" of the slide 12" and acts against the tensioning of the tensioning element 14. At the same time, the end 13a' of the sheath 13a on the slide side is pressed counter to the tensioning direction S' against the slide 12' and moves the slide 12' in the tensile direction Z' toward the slide 12". By exerting a tensile force transmitted via the Bowden cable 13 onto the slides 12' and 12", said slides are moved toward one another in the tensile direction Z' and/or Z". At the same time, they are guided through the slide guide 17.

The slide 12' thus serves as a support element 16 for the end 13a' of the sheath 13a on the slide side.

The movement of the slides 12' and 12" toward one another takes place by the transmission of a tensile force via the Bowden cable 13, a movement of the slides away from one another being carried out by means of the tensioning force of the tensioning element 14. Thus the slides may be moved toward one another by means of a single tensile means 13.

In a further embodiment according to the invention, which is not shown in the figures, just one slide may be provided which moves along the longitudinal axis of the backrest z. It is pretensioned by a tensioning element against a support element. The adjusting principle functions in a similar manner to FIG. 3 with the difference that the slide 12' is not movable but is fixed in its position as a support element 16. In this case, just one support yoke (11') is provided as an adjusting element for the back support. Alternatively, two slides extending parallel to one another along the backrest longitudinal direction z may be provided, the position of one respective adjusting yoke being adjusted as a result of the movement thereof.

Figure 4:
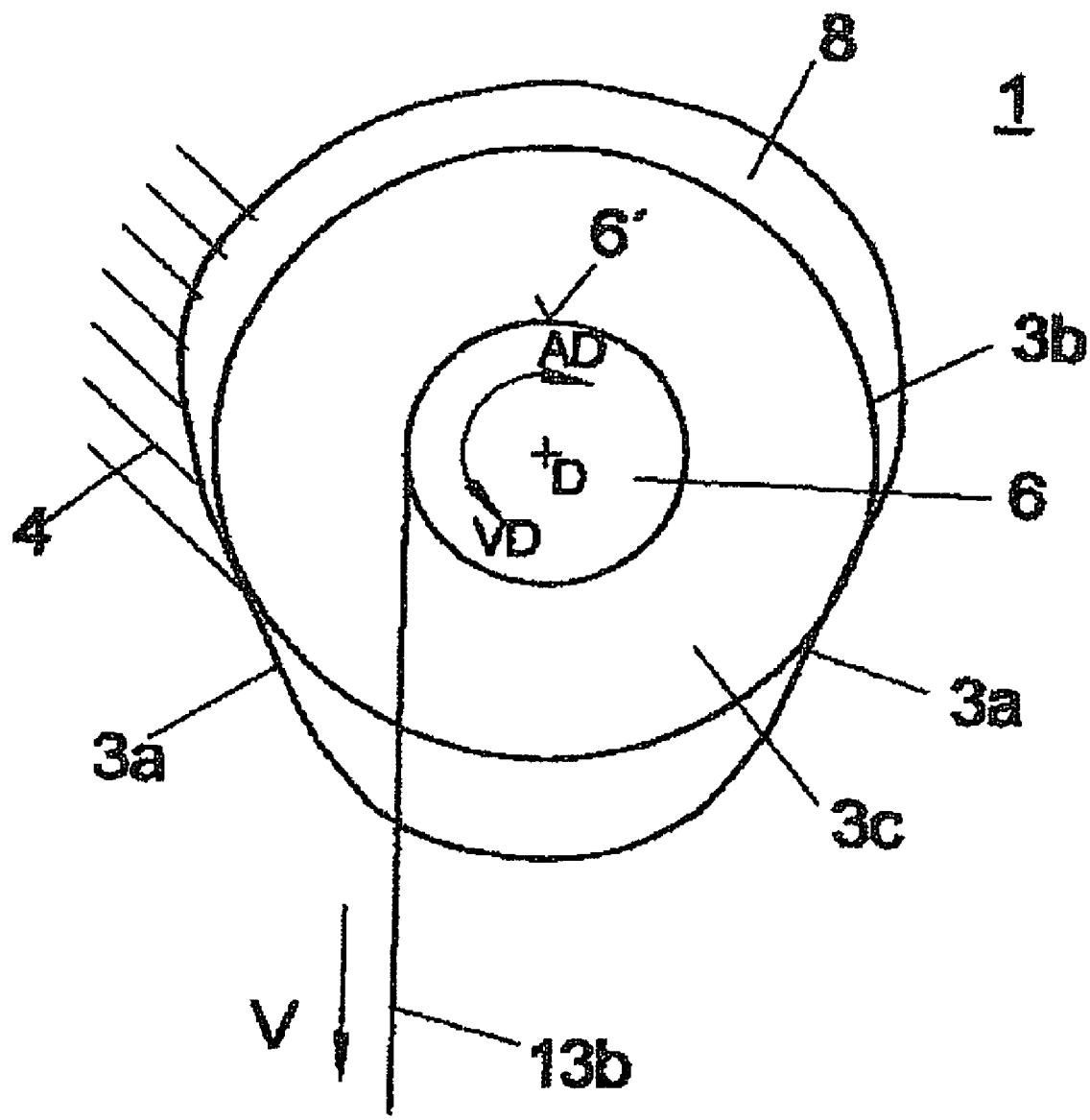
FIG. 4 shows a manual adjustment for the lumbar adjustment device of FIG. 1 in a schematic view with a rounded braking contour.

FIG. 4 shows a schematic view of a manual adjustment 1. It serves for transmitting a tensile force via a tensile means 13 (FIG. 4 shows the core 13b of the Bowden cable 13) onto the slide 12' and/or 12" (see FIG. 3).

The key element of the manual adjustment 1 is a cable pulley 6 which is rotatably mounted about a rotational axis D. FIG. 4 shows a section through the cable pulley 6 perpendicular to the rotational axis D. A roll-up surface 6' extends on an external surface of the cable pulley 6 which defines the cable pulley 6 in a circular manner. The roll-up surface 6' serves for receiving and rolling up the core 13b of the tensile means 13 of FIG. 3. The core 13b is fastened to the cable pulley 6 by the end which opposes the end 13b" on the slide side (see FIG. 3). When rotating the cable pulley 6, the core 13b is rolled up onto the roll-up surface 6' and/or rolled off therefrom according to the direction of rotation. As a result of the position of the angle of rotation of the cable pulley 6, an adjustment is made to the percentage of the core 13b rolled up onto the cable pulley 6 and the percentage rolled off the cable pulley. The cable pulley 6 comprises a brake disk 3c which is also rotatably mounted about the rotational axis D. The brake disk 3c and the cable pulley 6 are connected to one another in a rigid connection and may not be rotated relative to one another. They may consist either of a single piece or be configured in two pieces. The cable pulley 6 may be of disk-shaped configuration, as is the brake disk 3c.

The brake disk 3c comprises an external surface 3b remote from the rotational axis D and surrounding the rotational axis D, which is in frictional contact in a locked position of the manual adjustment 1 with a braking surface 3a. In the embodiment of FIG. 4, two braking surfaces 3a are provided which extend in a wedge-shaped manner toward one another. The imaginary section of the two braking surfaces 3a extends in this case parallel to the rotational axis D and opposes the rotational axis D along the path of the core 13b.

The braking surfaces 3a are provided on an inner face of a housing 4 of the manual adjustment 1 facing the cable pulley 6, transversely to the rotational axis D and define a housing opening 8 of the housing 4 in which the cable pulley 6 is arranged. In the locked position of the manual adjustment 1 according to FIG. 4, the brake disk 3c is pressed with its external surface 3b against the two braking surfaces 3a and wedged therebetween.

The core 13b leads away from the cable pulley 6 in a direction of extension V and is—as shown in FIG. 3—fastened to the slide 12" on which a pretensioning acts in the direction S", which is produced by the tensioning element 14. The tensioning force resulting from the spring force of the tensioning element 14 is transmitted by the slide 12" via the core 13b to the cable pulley 6 of the manual adjustment 1 of FIG. 4. The pretensioning thus produces a force on the cable pulley 6 in the direction of the direction of extension V of the core 13b. As a result of the spacing of the roll-up surface 6' from the rotational axis D the pretensioning produces a torque on the cable pulley 6 about the rotational axis D in the driven direction VD.

A shortening of the portion of the core 13b rolled off from the cable pulley 6, may be achieved by rotating the cable pulley 6 in the drive direction whilst the pretensioning ensures that the core 13b is unwound from the cable pulley when rotated in the driven direction. As a result, an adjustment of the slide position on the slide guide 17 (see FIG. 1) is possible by a single threadless cable pulley. With a rotation of the cable pulley 6, either the frictional force between the external surface 3b and the braking surfaces 3a is overcome by applying a rotational force or the cable pulley 6 is moved by a short length counter to the direction of extension V so that the external surface 3b is no longer in contact, i.e. in engagement, with the braking surface 3a.

Figure 5A:
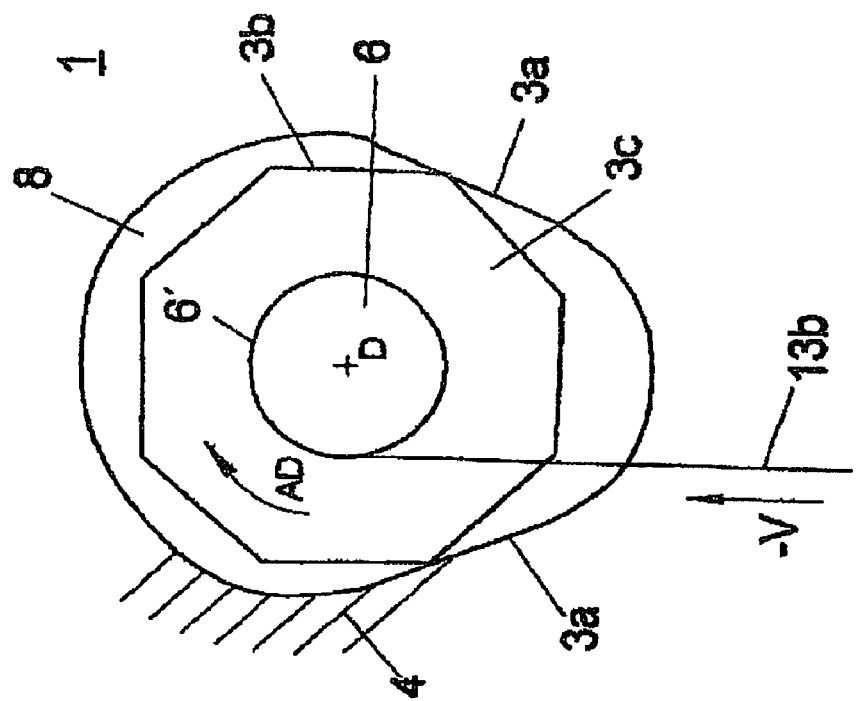
FIG. 5A shows a schematic view of a manual adjustment for a back support with a polygonal-type braking structure under pretension.
Figure 5B:
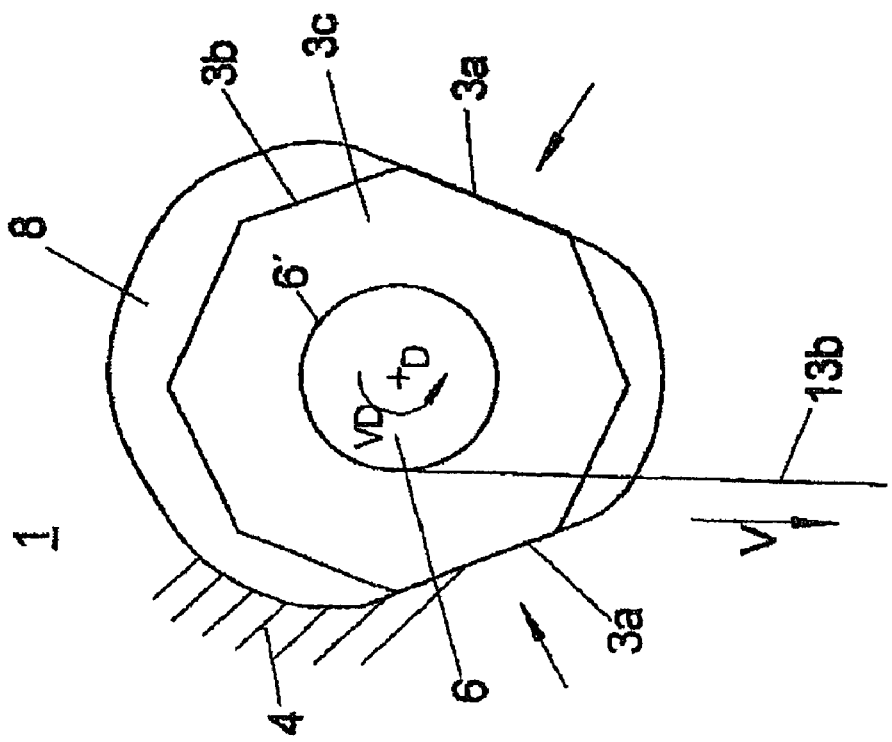
FIG. 5B shows the manual adjustment of FIG. 5A when rotated in the drive direction.

FIGS. 5A and 5B show a variant of the manual adjustment 1 of FIG. 4. Whilst in FIG. 4 the cross-sectional contour (the corresponding cross-sectional plane extends perpendicular to the rotational axis D) of the external surface 3b of the brake disk 3c is of smooth configuration, the contour of the external surface 3b of FIG. 5 is of polygonal-type configuration and comprises along the circumference of the brake disk 3c a plurality of corners. The contour (braking contour) of the external surface 3b extends in a linear manner between the corners.

In the locked position shown in FIG. 5A, two planar regions of the external surface 3b bear against the braking surfaces 3a. For a rotation of the cable pulley 6, therefore, not only the frictional force has to be overcome but also the cable pulley 6 has to be moved relative to the housing 4. Although a tensile force acts on the cable pulley 6 in the direction of extension V via the core 13b, said cable pulley does not rotate but remains in its locked position.

In FIG. 5B the cable pulley 6 is rotated in the drive direction AD, so that a tensile force is transmitted in the negative direction of extension V to the core 13b. The number of different locked positions is determined by the number of polygonal corners of the braking contour 3b. The greater the number of polygonal corners of the brake disk 3c, the greater the number of increments by which the back support is able to be adjusted. The circular configuration of the brake disk 3c in the embodiment of FIG. 4 results in a stepless adjustment.

Figure 6:
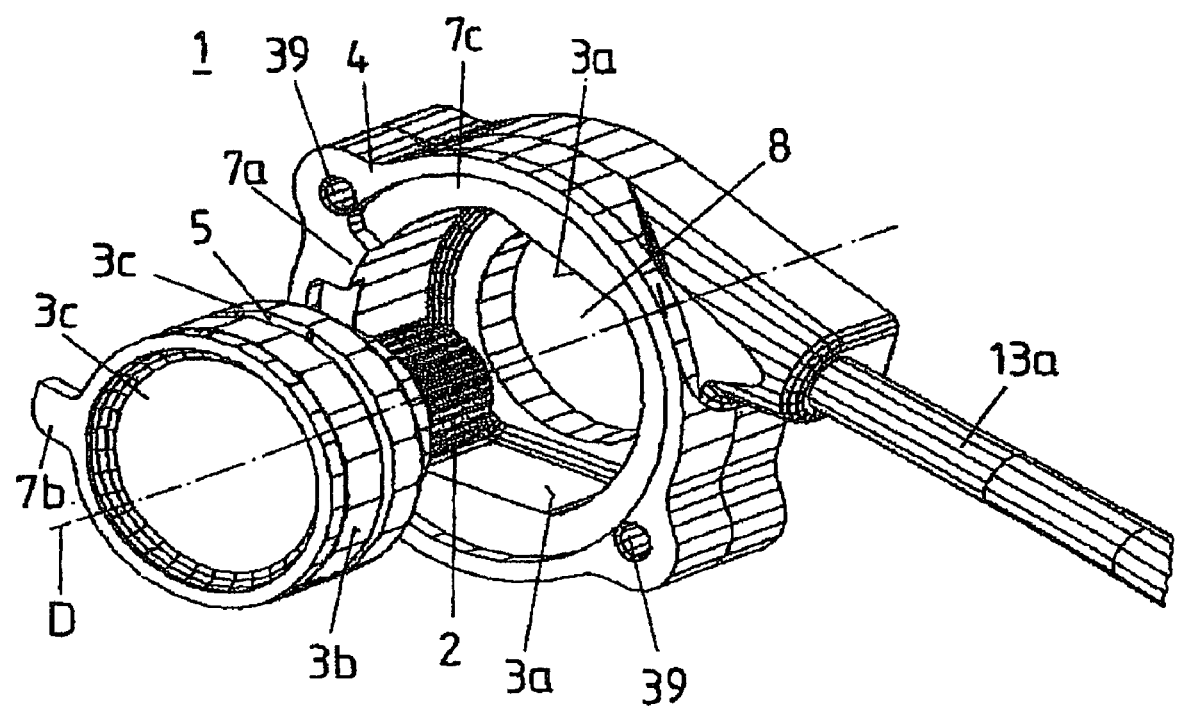
FIG. 6 shows a perspective view of a manual adjustment for a back support with a hand wheel.

FIG. 6 shows a further embodiment of a manual adjustment 1 according to the invention in an exploded view. The external surface 3b is again of polygonal-type configuration in cross section (braking contour) On the cable pulley 6, in addition to the brake disks 3c, a hand wheel 2 is also fastened in a rigid connection relative to the cable pulley 6. It may be actuated by a seat user for adjusting the back support, by being rotated about the rotational axis D.

Configured between the brake disks 3c is a cable groove 5 which serves to receive the core of a Bowden cable, the sheath 13a thereof being supported against the housing 4 of the manual adjustment 1. The core 13b of the Bowden cable 13 is wound in the cable groove 5 onto, the roll-up surface 6' of the cable pulley 6 (not visible in FIG. 6). When rotating the cable pulley 6 in the drive direction AD, and thus when winding-on the core 13b, a tensile force is provided which always acts in the same direction along the core 13b.

A stop 7b is configured on one of the brake disks 3c, which is guided during rotation along a guide 7c. The guide 7c is configured as a recess in the housing 4 and is interrupted by a counter stop 7a, which serves for limiting the angle of rotation about which the cable pulley 6 may be rotated. In this case, the stop 7b serves both to define the adjustment path when rotating the cable pulley 6 in the drive direction AD and when rotating the cable pulley 6 in the driven direction VD. The maximum adjustment path is in this case approximately 360°.

For securing the housing 4 to a support of the manual adjustment 1, two through-openings 39 are provided on the housing 4 which extend along the rotational axis D and oppose one another transversely to the rotational axis D. Screws or similar fastening means may be inserted in these through-openings 39 and secured to the support of the manual adjustment 1.

Figure 8:
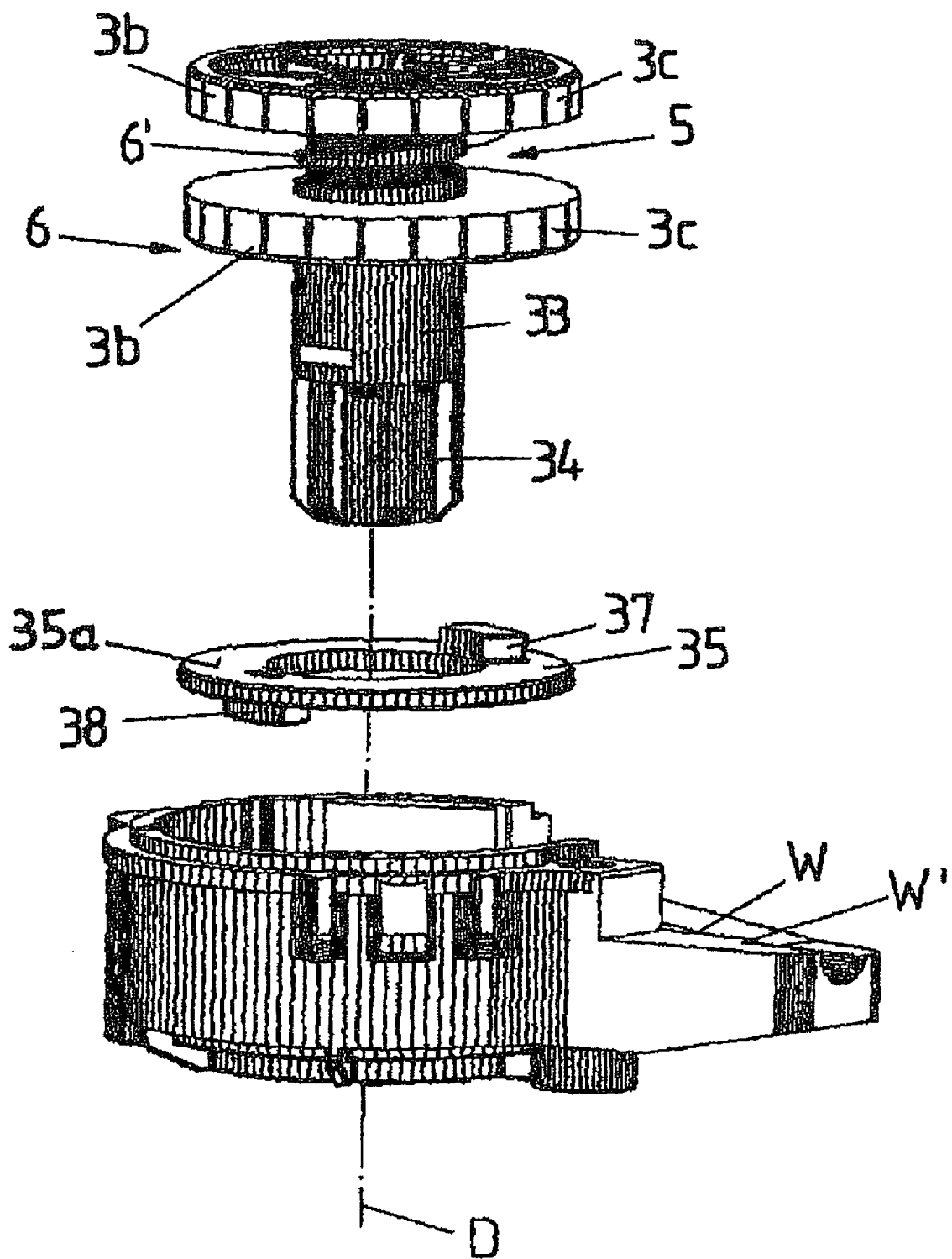
FIG. 8 shows a perspective exploded view of a modification of the manual adjustment shown in FIG. 6, in which a stop of a cable pulley cooperates via a rotatably mounted coupling member with a counter stop of the housing of the manual adjustment for limiting the adjustment path of the cable pulley.
Figure 10:
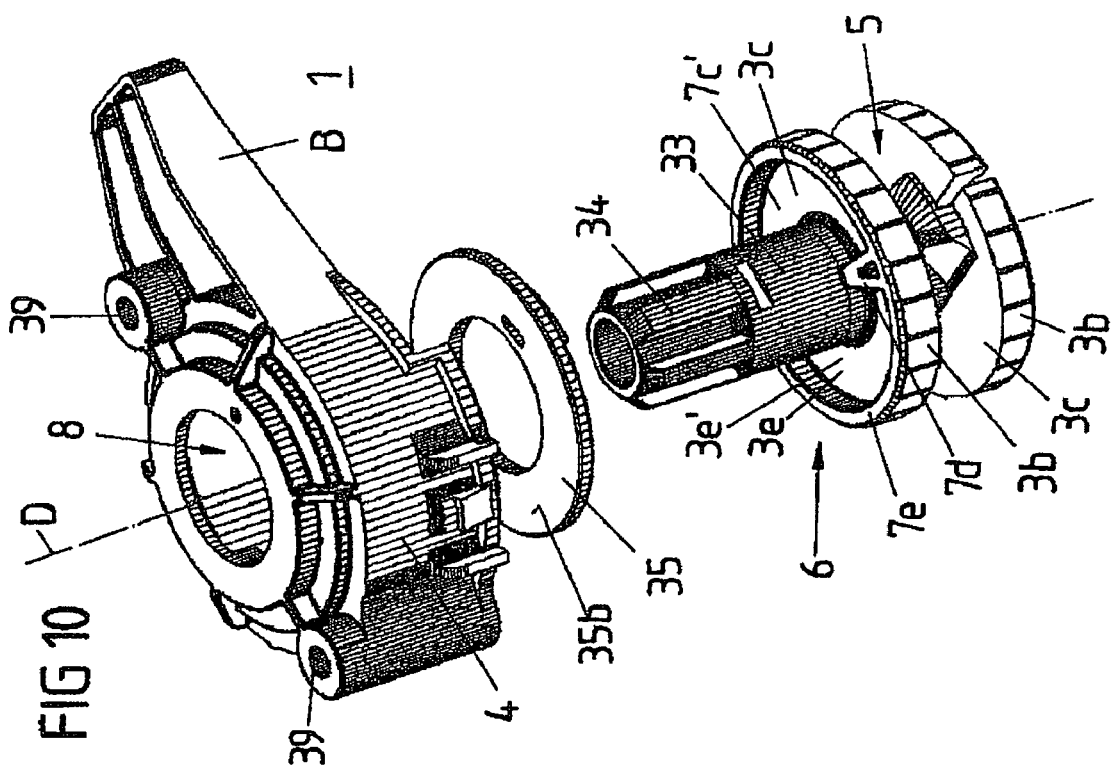
FIG. 10 shows a further perspective exploded view of the manual adjustment shown in FIGS. 7 and 8.
Figure 9:
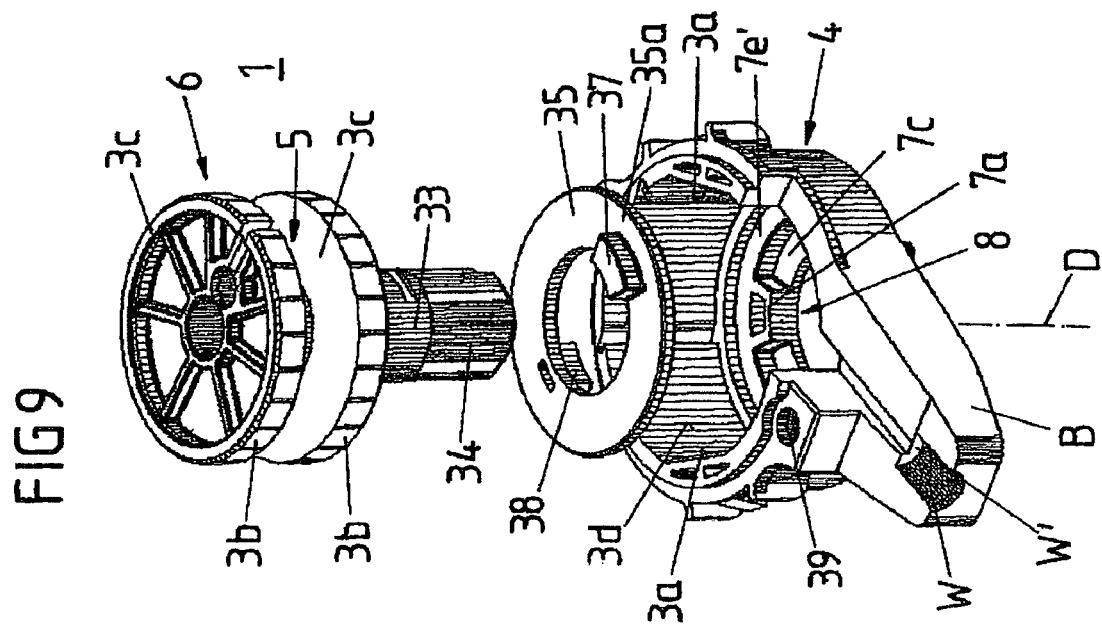
FIG. 9 shows a further perspective exploded view of the manual adjustment shown in FIG. 8.

FIG. 8 shows in connection with FIGS. 9 and 10 an exploded view of a modification of the manual adjustment 1 shown in FIG. 6. For adjusting a motor vehicle part, in particular a back support of a motor vehicle seat, a cable pulley 6 is provided rotatably mounted about a rotational axis D in a housing 4. According to FIGS. 3, 4, 5A and 5B a tensile means in the form of a core 13 of a Bowden cable may be rolled up onto the cable pulley 6, which serves for coupling the manual adjustment 1 to an adjusting device, in particular a lumbar adjustment device 10 (see FIGS. 1 to 3). In this case, a free end portion of the sheath 13a surrounding the core 13b is secured in a recess W of a region B of the housing 4 projecting from the housing 4, so that a free end of the sheath 13a is able to be supported on an abutment W', which is formed by a step-like narrowing of the recess W, along which the core 13b of the Bowden cable projecting from the sheath 13a is guided into the housing 4, where it is partially rolled up onto a roll-up surface 6' (see FIGS. 4, 5A and 5B) and is fastened via a free end region of the portion of the core 13b rolled up onto the roll-up surface 6' to the cable pulley 6. To this end, said free end region may, for example, be widened and engage in a recess configured on the cable pulley 6, so that the cable pulley 6 may absorb a tensile force acting on the core 13b.

The cable pulley 6 comprises a shaft 33 extending along the rotational axis D as well as two brake disks 3c surrounding the shaft 33 according to FIG. 6, which project from the shaft 33 along the rotational axis D, spaced apart relative to one another on both sides of the roll-up surface 6' surrounding the shaft 33 (see FIGS. 4, 5A and 5B), and in this case form the cable groove 5 circulating between the two brake disks 3c (see FIG. 6) which serves to receive the portion of the core 13b rolled up onto the cable pulley 6.

The cable pulley 6 is inserted along the rotational axis D with a free end region 34 of the shaft 33 to the front into a continuous housing opening 8 of the housing 4, aligned with the rotational axis D, such that the free end region 34 of the shaft 33 is guided out of the housing 4 along the rotational axis D, and the cable pulley 6 and namely the two brake disks 3c extending perpendicular to the shaft 33, together with the cable groove 5, are surrounded in cross section by the housing 4. In this case, the external faces 3b of the brake disks 3c according to FIG. 6 face an inner face 3d of the housing 4 facing the cable pulley 6 and comprise according to FIG. 6 a circular polygonal-type contour in a cross-sectional plane extending transversely to the rotational axis D. In other words, the external surfaces 3b of the two brake disks 3c are made up of planar surface segments which respectively form an edge with an adjacent surface segment i.e. are angled relative to one another.

The external surfaces 3b are thus configured according to FIGS. 5A and 5B, in a locked position of the cable pulley 6, to be in engagement with braking surfaces 3a which are angled relative to one another in a wedge-shaped manner and which are provided on the inner face 3d of the housing 4.

For actuating the manual adjustment 1, and namely by rotating the cable pulley, a hand wheel may be pushed onto the free end region 34 of the shaft 33 (not shown in FIGS. 8 to 10). So that the hand wheel may be easily connected to the shaft 33 in a manner which is fixed in terms of rotation, recesses are formed at the free end region 34 of the shaft 33 extending along the rotational axis D, into which positive connection regions of the hand wheel may engage for securing the hand wheel to the shaft 33 in a manner which is fixed in terms of rotation.

If the cable pulley 6 is moved out of the locked position by corresponding actuation of the hand wheel 2 (not shown in FIGS. 8 to 10) the cable pulley 6 may be moved to and fro between a first and a second end position in a drive direction AD and a driven direction VD opposing the drive direction AD (see FIGS. 4, 5A and 5B) for adjusting the lumbar adjustment device 10 and/or the back support 32 according to FIGS. 1 to 3.

To define the adjustment path extending from the first end position to the second end position, the cable pulley 6 comprises a stop 7d projecting along the rotational axis D from the cable pulley 6, which is configured on an inner face 3e of the brake disk 3c facing the housing 4, which is at a shorter distance from the free end region 34 of the shaft 33 along the rotational axis D. Said brake disk 3c is also denoted hereinafter as the inner brake disk 3c.

The stop 7d is provided when rotating the cable pulley 6 in the drive direction or driven direction AD, VD to strike against a first stop region 37 of a coupling member 35 via which the stop 7d may cooperate with a counter stop 7a on the housing side for limiting the adjustment path of the cable pulley 6.

The coupling member 35 encompasses the free end region 34 of the shaft 33 transversely to the rotational axis D in an annular manner and has a first face 35a facing the stop 7d and a second face 35b remote from the stop 7d, the first stop region 37 projecting from the first face 35a of the coupling member 35 along the rotational axis D, and namely counter to the stop 7d, so that said stop when rotating the cable pulley in the drive direction AD or in the driven direction VD may strike against the first stop region 37. According to the position of the stop 7d relative to the first stop region 37, the cable pulley 6 may be rotated to a maximum extent by an angle of rotation of 360°, before the stop 7d is in engagement with the first stop region 37. After the striking of the stop 7d against the first stop region 37, the cable pulley 6 drives the coupling member 35 with continuous (in the same direction) rotation of the cable pulley 6. In this case the coupling member 35 bears—for the purpose of its rotatable mounting in the housing 4—with its first face 35a against one first sliding surface 7e provided on the inner face 3e of the inner brake wheel 3c as well as with its second face 35b against an annular second sliding surface 7e' configured on the housing 4.

For limiting the common rotation of the coupling member 35 and the cable pulley 6, therefore, on the second face 35b of the coupling member 35 remote from the first face 35a, a second stop region 38 is provided which projects along the rotational axis D from the housing 4. As the coupling member 35 may also be rotated by a maximum of approximately 360° (relative to the housing 4), before the second stop region 38 strikes the counter stop 7a, the use of the rotatable coupling member 35 results, in total, in a maximum adjustment path of the cable pulley in or counter to the drive direction AD of approximately 720°. So that the first and the second stop region 37, 38 of the coupling member 35, when adjusting the cable pulley 6, may be guided along the adjustment path in a defined manner, configured on the housing 4 is a guide 7c (interrupted by the counter stop 7a), along which the second stop region 38 may slide, and provided on the inner brake wheel 3c is a recess 3e' facing the first stop region 37 along the rotational axis D, surrounding the rotational axis D in an annular manner, into which the first stop region 37 engages such that when adjusting the cable pulley 6 and/or the coupling member 35 said first stop region is guided through the recess 3e'.

Naturally, a plurality of such coupling members 35 may be used in order to lengthen the maximum adjusting angle respectively by a further 360° (approximately).

Figure 11:
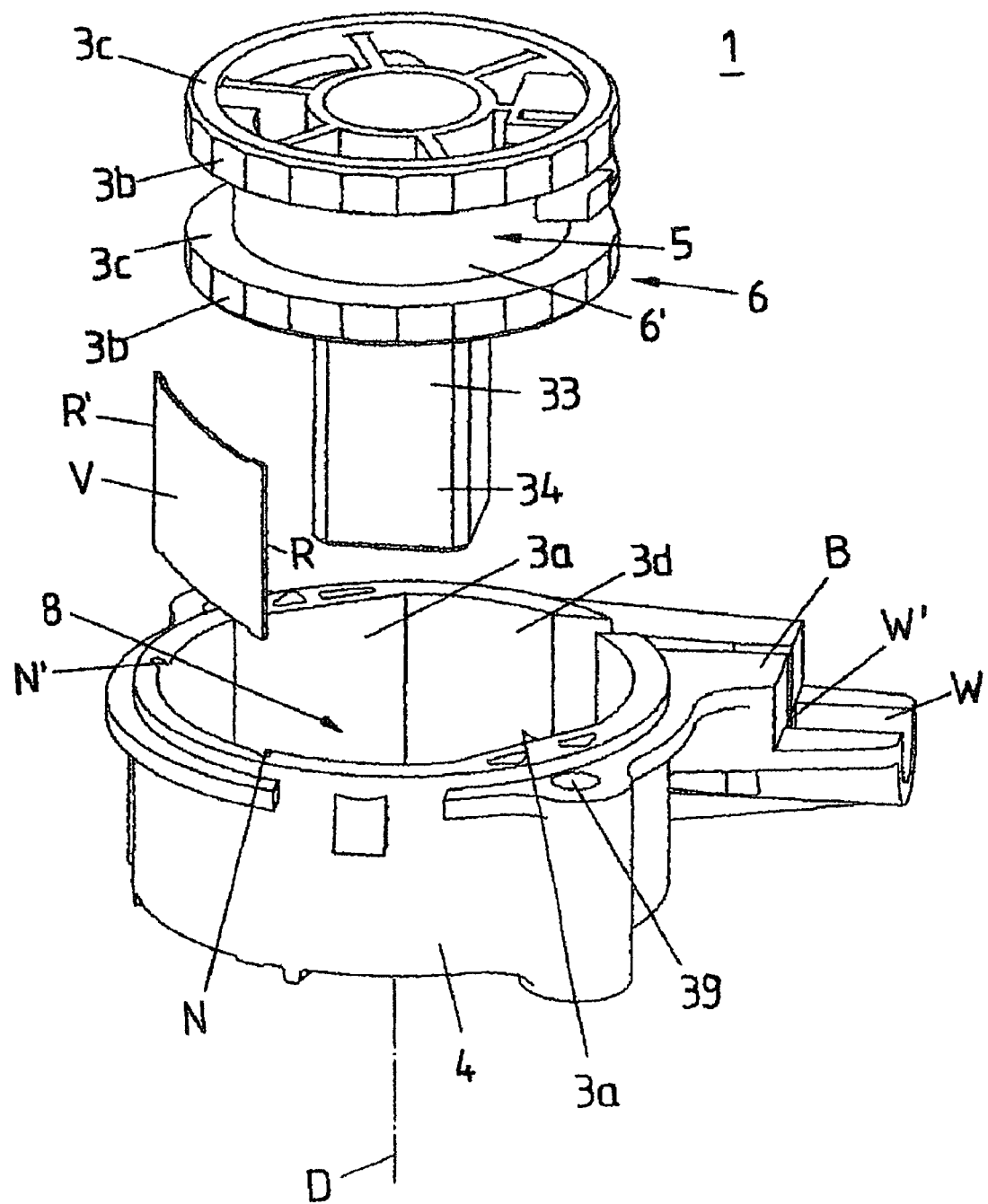
FIG. 11 shows a perspective exploded view of a variant of the manual adjustment according to the invention with an additional pretensioning element, which is pretensioned against the cable pulley such that said cable pulley may not be moved inadvertently from a locked position.

FIG. 11 shows in connection with FIGS. 12 and 13 a modification of the type shown in FIG. 6 and/or FIGS. 8 to 10 in which in contrast to FIG. 6 and/or FIGS. 8 to 10 an additional pretensioning element V of planar configuration is provided on the inner face 3d of the housing 4. The pretensioning element V is pretensioned against the cable pulley 6 and presses said cable pulley against the two braking surfaces 3a running obliquely toward one another, so that the cable pulley 6 is wedged in a non-actuated position with the braking surfaces 3a (positive and frictional connection), even with less pretensioning acting on the core 13b in the direction of extension V. To this end, the pretensioning element V bears under pretension against the external surfaces 3b of the brake disks 3c of the cable pulley 6, the pretensioning element preferably being configured as a leaf spring.

For securing the pretensioning element V on the inner face 3d of the housing 4 grooves N, N' are configured, extending along the rotational axis D, which oppose both one another and the brake surfaces 3a transversely to the rotational axis D. The pretensioning element V is inserted into these grooves N, N' along the rotational axis D with two edge regions R, R' of the pretensioning element V extending along the rotational axis D, the grooves N, N' respectively encompassing one of the two edge regions R, R' in cross section.

The invention claimed is:

1. A manual adjustment device of a back support on a vehicle seat, the manual adjustment device comprising:
   a cable pulley selectively rotatable in one of a drive direction and a driven direction oriented counter to the drive direction;
   a tensile device associated with the cable pulley, wherein the tensile device is configured to be rolled up onto the cable pulley by rotating the cable pulley in the drive direction;
   a lock configured to restrict the rotation of the cable pulley in the driven direction when in a locked position;
   wherein in the locked position, the cable pulley is in frictional contact with at least one braking surface of the lock to restrict the rotation of the cable pulley in the driven direction;
   wherein the tensile device is configured to be coupled to the back support of the vehicle seat such that the rotation of the cable pulley in at least one of the drive direction and the driven direction affects an adjustment of the back support;
   wherein a pretensioning acts on the cable pulley to produce a torque of the cable pulley in the driven direction; and
   wherein in the locked position, the pretensioning presses the cable pulley against the at least one braking surface.

2. The manual adjustment device of claim 1, wherein the pretensioning acts on the cable pulley via the tensile device.

3. The manual adjustment device of claim 2, wherein the tensile device is coupled to an element of a lumbar adjustment device for adjusting the back support, wherein the pretensioning acting on the element is transmitted by the tensile device and acts on the cable pulley.

4. The manual adjustment device of claim 3, wherein the pretensioning is produced on the element by a resilient tensioning element.

5. The manual adjustment device of claim 3, wherein the element is configured as a movable slide.

6. The manual adjustment device of claim 1, wherein a rotation of the cable pulley in the drive direction takes place counter to the torque produced by the pretensioning in the driven direction.

7. The manual adjustment device of claim 1, further comprising a housing at least partially surrounding the cable pulley.

8. The manual adjustment device of claim 1, further comprising a rotatable hand wheel coupled to the cable pulley such that a rotation of the hand wheel causes a rotation of the cable pulley.

9. The manual adjustment device of claim 8, further comprising a lock configured to restrict the rotation of the cable pulley in the driven direction when in a locked position, wherein the lock is releasable by rotating the hand wheel in at least one of the drive direction and the driven direction.

10. The manual adjustment device of claim 9, wherein the rotation of the cable pulley takes place in the drive direction by rotation of the hand wheel counter to the pretensioning.

11. The manual adjustment device of claim 9, wherein the cable pulley is rotatably mounted on a housing about a rotational axis.

12. The manual adjustment device of claim 9, further comprising a housing, wherein a counter stop is configured on the housing.

13. The manual adjustment device of claim 9, wherein a coupling member is rotatably mounted in a housing about a rotational axis.

14. The manual adjustment device of claim 9, further comprising a housing, wherein the housing has a guide for guiding a first stop region along an adjustment path, when the first stop region is slidable along the adjustment path.

15. The manual adjustment device of claim 14, wherein the counter stop projects from a guide along the rotational axis so that a second stop region is configured to strike against the counter stop, when rotating the coupling member into the second end position, in order to limit the rotation of the coupling member.

16. The manual adjustment device of claim 1, wherein the tensile device is configured as a Bowden cable, wherein a core of the Bowden cable is fastened to the cable pulley.

17. The manual adjustment device of claim 16, further comprising a housing, wherein the sheath of the Bowden cable is supported against the housing.

18. A manual adjustment device of a back support on a vehicle seat the manual adjustment device comprising:
   a cable pulley selectively rotatable in one of a drive direction and a driven direction oriented counter to the drive direction;
   a tensile device associated with the cable pulley, wherein the tensile device is configured to be rolled up onto the cable pulley by rotating the cable pulley in the drive direction;
   a lock configured to restrict the rotation of the cable pulley in the driven direction when in a locked position
   wherein in the locked position, the cable pulley is in frictional contact with at least one braking surface of the lock to restrict the rotation of the cable pulley in the driven direction;
   wherein the tensile device is configured to be coupled to the back support of the vehicle seat such that the rotation of the cable pulley in at least one of the drive direction and the driven direction affects an adjustment of the back support;
   wherein a pretensioning acts on the cable pulley to produce a torque of the cable pulley in the driven direction; and
   wherein the at least one braking surface is configured on a housing.

19. The manual adjustment device of claim 18, wherein the pretensioning places the lock into the locked position.

20. The manual adjustment device of claim 18, wherein the lock automatically adopts the locked position when the cable pulley is stationary in a non-actuated position.

21. The manual adjustment device of claim 20, further comprising a rotatable hand wheel coupled to the cable pulley such that a rotation of the hand wheel causes a rotation of the cable pulley, wherein the cable pulley is stationary in the non-actuated position when the hand wheel is not actuated.

22. The manual adjustment device of claim 18, wherein the lock comprises a further braking surface, the one braking surface and the further braking surface being arranged in a wedge-shaped manner relative to one another, and the cable pulley being arranged between the two braking surfaces, wherein in the locked position the cable pulley is in frictional contact with both braking surfaces.

23. The manual adjustment device of claim 22, wherein the cable pulley is wedged in the locked position between both braking surfaces.

24. The manual adjustment device of claim 18, wherein the cable pulley has an external surface remote from a rotational axis of the cable pulley, wherein in the locked position the external surface is in frictional contact with at least one braking surface.

25. The manual adjustment device of claim 24, wherein the external surface has one of a round and polygonal-type contour in cross section.

26. The manual adjustment device of claim 24, wherein at least one of the external surface and the at least one braking surface is of resilient configuration.

27. The manual adjustment device of claim 18, further comprising a pretensioning element pretensioned against the cable pulley and pressing the cable pulley against the at least one braking surface in order to prevent the cable pulley from moving out of the locked position.

28. The manual adjustment device of claim 27, wherein the pretensioning element presses the cable pulley against a further braking surface in order to prevent the cable pulley from moving out of the locked position.

29. The manual adjustment device of claim 27, wherein the pretensioning element opposes the two braking surfaces transversely to a rotational axis.

30. The manual adjustment device of claim 27, wherein the pretensioning element is secured to an inner face of a housing opposing the cable pulley and transversely to a rotational axis.

31. The manual adjustment device of claim 27, wherein the pretensioning element is configured as a leaf spring.

32. The manual adjustment device of claim 30, wherein the pretensioning element is configured as a leaf spring, wherein for securing the leaf spring on the inner face to a first edge region extending along the rotational axis, the leaf spring is inserted into a first groove provided along the rotational axis on the housing, and to a second edge region opposing the first edge region transversely to the rotational axis, the leaf spring is inserted into a second groove provided along the rotational axis on the housing.

33. The manual adjustment device of claim 18, wherein an actuation of the cable pulley releases the locked position.

34. A manual adjustment device of a back support on a vehicle seat, the manual adjustment device comprising:
   a cable pulley selectively rotatable in one of a drive direction and a driven direction oriented counter to the drive direction;
   a tensile device associated with the cable pulley, wherein the tensile device is configured to be rolled up onto the cable pulley by rotating the cable pulley in the drive direction;
   a stop of the cable pulley;
   wherein the tensile device is configured to be coupled to the back support of the vehicle seat such that the rotation of the cable pulley in at least one of the drive direction and the driven direction affects an adjustment of the back support;
   wherein a pretensioning acts on the cable pulley to produce a torque of the cable pulley in the driven direction; and
   wherein when rotating the cable pulley from a first end position into a second end position for limiting an adjustment path, the stop cooperates with a counter stop being stationary relative to a rotational axis.

35. The manual adjustment device of claim 34, wherein the stop cooperates with the counter stop via an additional coupling member being rotatable about the rotational axis.

36. The manual adjustment device of claim 35, wherein the coupling member has a first stop region being engagable with the stop and a second stop region being engagable with the counter stop, and wherein when rotating the cable pulley in the direction of a second end position, the stop of the cable pulley engages the first stop region, so that the coupling member is driven and the cable pulley and the coupling member are rotatable together about the rotational axis until the second stop region engages the counter stop.

37. The manual adjustment device of claim 36, wherein the first and the second stop regions project from the coupling member in opposing directions along the rotational axis.

38. The manual adjustment device of claim 36, wherein the first stop region opposes the second stop region transversely to the rotational axis.

39. The manual adjustment device of claim 36, wherein the stop projects from the cable pulley along the rotational axis so that, when rotating the cable pulley into the second end position, the stop is able to press against the first stop region of the coupling member in order to drive the coupling member.

40. The manual adjustment device of claim 35, wherein the coupling member at least partially surrounds the rotational axis.

41. The manual adjustment device of claim 35, wherein the coupling member encompasses the cable pulley in cross section.

42. The manual adjustment device of claim 35, wherein the stop cooperates with the counter stop via a plurality of coupling members being rotatable about the rotational axis, one of the coupling members comprising a first stop region cooperating with the stop and a further one of the coupling members comprising a second stop region cooperating with the counter stop.

43. The manual adjustment device of claim 35, wherein the coupling member surrounds said rotational axis in an annular manner.

* * * * *